Patented Sept. 10, 1940

2,214,469

UNITED STATES PATENT OFFICE 2,214,469

PROCESS FOR MANUFACTURING HALOGENATED PHTHALOCYANINES

Reginald Patrick Linstead, London, and Charles Enrique Dent, Manchester, England, assignors to Imperial Chemical Industries Limited, a corporation of Great Britain No Drawing. Application July 28, 1936, Serial No. 93,127. In Great Britain August 14, 1935

9 Claims. (Cl. 260—314)

This invention relates to the manufacture of new bluish green or green compounds, useful as coloring matters, especially as pigments or ingredients in pigmenting compositions.

According to the invention we treat the compounds now known as phthalocyanines with chlorinating or brominating agents in such a way that they become halogenated to a high degree, as hereinafter explained.

It will be understood that the term phthalocyanine is the group name for a class of compounds of which the simplest member is phthalocyanine itself, also known as "metal-free" phthalocyanine. This compound can be conveniently represented by the formula $$(C_8H_4N_2)_4.H_2$$

(cf. Linstead and others, "Journal of the Chemical Society," 1934, 1016–1039), wherein the two hydrogen atoms represented separately are so shown because it is they that become replaced when metal phthalocyanines are formed.

Various halogenated phthalocyanines are known.

Thus, a copper monochlorophthalocyanine may be obtained by simultaneous chromophore formation and chlorination (British Patent No. 410,814, Example 3); and a copper tetra-(4)-chlorophthalocyanine has been described by synthesis from 4-chlorophthalonitrile (British Patent No. 410,814). Likewise the octa (3,4)- and octa (3,6)-chlorophthalocyanines, as "metal free" (parent) compound or magnesium derivative thereof, have been prepared synthetically from correspondingly chlorinated initial organic material (British Patent No. 389,842 and 390,149). That introduction of chlorine by substitution causes the shade to become greener is here indicated, but it has been found by experiment that a compound having a desirable shade of green cannot readily be obtained by the processes referred to, and it has also been found that even among the products of these processes the greenness of the shade appears to depend not only on the number of the halogen atoms present in the molecule but also on their position.

The halogenated phthalocyanines of the present invention, which differ from those referred to above in that they are made by halogenation of already-formed phthalocyanines have different properties, even when the number of halogen atoms in the molecule is the same. It is accordingly to be presumed that the orientation is different, or else the distribution of the halogen atoms over the molecule is not uniform. Be the ultimate theoretical explanation of the observed differences as it may, the invention relates to the production of what are in fact new substances.

An object of the invention is, as said, the production of bluish green to green compounds. It is now found that when in any one phthalocyanine, the color of which (applied as a pigment) is greenish blue to blue, there is direct substitution of hydrogen by halogen, then the shade becomes progressively, but not uniformly progressively, greener as the number of halogen atoms increases. There is a stage when the tendency to become green becomes pronounced, and this is when the number of halogen atoms introduced by the process of the invention is about 8.

As the invention is directed to the production of useful green coloring matters, it is immaterial whether or not the products obtained are chemically homogeneous, so long as their color is that desired. The invention accordingly includes the production of mixtures of compounds.

Although, for facility of expression, halogenation is spoken of at large, it will be understood that the invention is limited to the production of chloro and bromo compounds by substitution, the production of fluoro compounds needing special technical provision and that of iodo compounds being governed by the peculiar characteristics of iodine.

As indicated the halogenation is carried out by treating the phthalocyanines with elementary chlorine or bromine, or by use of other known halogenating agents, e. g., thionyl chloride (see here, for instance, Silberrad, "Journal of the Society of Chemical Industry," 1926, 45, page 38), sulphuryl chloride. The halogenation may be carried out in presence of known halogen carriers, e. g., aluminium chloride or bromide, antimony tri or pentachloride, ferric chloride, zinc chloride, iodine, sulphur, sulphur chloride, phosphorus pentachloride.

Of these however, it is preferred not to use metallic salts especially when halogenation of metal-free phthalocyanines is in question, because of the risk that metal phthalocyanines may be formed, and the shade of the product undesirably affected. This may be the case when iron or iron halides are used, but when aluminium halides are used, the simultaneous introduction of aluminium is not necessarily technically disadvantageous.

For halogenation the phthalocyanine may be dissolved or suspended in a solvent or liquid medium, but as it is found that chlorination or bromination to the degree desired does not readily take place unless a high temperature and/or a relatively large amount of reagent is used it is possible to dispense with the use of such aids.

The metal phthalocyanines are found to be less readily halogenated than the metal-free compounds, and consequently it may be necessary to use a more concentrated reagent and a higher temperature in order that the halogenation may proceed to the same degree, as measured by number of halogen atoms introduced. It may also be advisable that the conditions of treatment be not too drastic, as it may be that the product obtained is not the desired halogenated metal phthalocyanine, but the corresponding metal free compound, the metal having been removed in the process. On the other hand, it may be that it is technically advantageous to displace the metal in this way, as thereby a greener substance may be obtained more cheaply, some metal phthalocyanines being bluer than the corresponding metal-free compounds.

For a better understanding of some features of the invention it will be explained that we have found by experiment that when a phthalocyanine, for example, the metal-free phthalocyanine of formula $(C_8H_4N_2)_4H_2$ is treated with bromine there takes place (1) an initial combination of bromine and phthalocyanine whereby brown unstable compounds are formed; (2) simultaneously or successively, according to conditions, some halogen becomes combined more stably, by substitution in the benzene nuclei of the phthalocyanine molecule. This second reaction proceeds rapidly at high temperature and under pressure, but may need a long time, e. g., 3 or 4 weeks, at room temperature and even then appears not to proceed to the point when the eventual products can be described as exhaustively halogenated. Thus, according to conditions there are produced compounds which have some bromine firmly combined and some bromine loosely combined. The latter is removable by a treatment with aqueous alkali or by heat.

Other basic substances than aqueous alkali may be used to remove the more loosely combined halogen. Pyridine, for instance, is very effective, and a treatment with pyridine also serves to purify the products obtained.

The products obtained as isolated from the reaction mixture may be crystalline, and the crystals are hard. In this state the substances are not usually suitable for application as pigments and need to be so treated that they become more finely divided. They dissolve in sulphuric acid and are precipitated when the solution is poured into water. When so precipitated they are obtained in finely divided form.

The invention is illustrated, but not limited, by the following examples, in which the parts are by weight.

Example 1

2 parts of metal-free phthalocyanine (see British specification No. 389,842) and 3.4 parts of bromine are mixed. The mixture is heated in a sealed vessel to 300° C. and kept at that temperature for about 2½ hours. The vessel is opened, whereupon hydrogen bromide becomes released and there remains 4 parts of a yellowish brown powder with a strong odour of bromine. This powder is heated at about 250° C. in an evacuated vessel, the heating being continued until bromine and hydrogen bromide cease to be evolved. There then remains a bright green powder.

This substance is very sparingly soluble in organic solvents but can be crystallised from boiling α-chloronaphthalene. It then forms a micro-crystalline powder (Bromine content: 63%, corresponding with about 11 atoms of bromine per mol.).

The substance, when prepared in a suitable state of dispersion, is a useful green pigment, being very fast to light.

Example 2

5 parts of metal-free phthalocyanine and 15 parts of chlorine (liquid) are heated in a closed vessel at 250° C. for six hours. The vessel is opened, the excess of chlorine and any hydrogen chloride formed being allowed to escape and be suitably absorbed. The solid residue is then heated at 250° C. until no more chlorine is evolved. A green powder is thus obtained. This contains 45.7% of chlorine corresponding with 12.2 atoms of chlorine per molecule.

Example 3

10 parts of copper phthalocyanine (see Example 2 of British specification No. 410,814) and 96 parts of bromine are heated together in a sealed vessel at 210° C. for 2½ hours. Excess of bromine and hydrogen bromine produced are allowed to escape and the product is heated at 260° C. until no more bromine and hydrogen bromide are evolved. The greenish blue compound then contains 42.5% of bromine or about 5.3 atoms of bromine per mol. The substance is mixed afresh with 64 parts of bromine and the mixture is heated as before but at 290° for 5 hours, excess of bromine and hydrogen bromide being allowed to escape as before. There remains a brown powder. When this is heated at 260° C. bromine and hydrogen bromide escape and there is left a green powder.

For analysis the substance is crystallized from chloronaphthalene, it then contains 66.2% of bromine or about 12.6 atoms per mol. The atomic proportion is based on a calculation that the compound is substantially a metal-free phthalocyanine; the material, purified for analysis, contains almost no copper, that having been lost as explained above.

The green powder suitably dispersed, as described in Example 4, is a clear green pigment.

Example 4

1 part of metal-free phthalocyanine is heated in an autoclave with 8 parts of sulphuryl chloride for 4½ hours at 230° C. The vessel is open whilst still warm and the excess of sulphuryl chloride, the hydrogen chloride and sulphur dioxide are allowed to escape. A greenish-brown powder remains. This is stirred with an excess of warm dilute aqueous caustic soda, labile chlorine being thus removed. The compound is filtered off, washed with water and dried.

This compound contains 46% chlorine or 12 atoms of chlorine per mol.

To transform it into a suitably finely divided condition for use as a pigment it is dissolved in about ten times its weight of concentrated sulphuric acid. A reddish brown solution is obtained. This solution is poured into cold water, the compound being thus reprecipitated in finely divided form. It is filtered off, washed with water, and either dried or preserved as paste.

When applied as a pigment, e. g., in lithographic ink, it is found to have a bright pure green shade.

Example 5

2 parts of metal-free phthalocyanine, 16 parts of sulphuryl chloride, and 9 parts of anhydrous aluminium chloride are heated in a closed vessel at 200–210° C. for ½ hour. The excess of sulphuryl chloride is distilled off and there remains a red solid. This is stirred into cold water. The solid which becomes green, is filtered off and washed. To it is added a sufficiency of aqueous caustic alkali (to remove "labile" chlorine). The warmed mixture is filtered. The green solid is filtered off, washed and dried.

This substance dissolves in sulphuric acid to give a brown solution which when poured into water gives a green precipitate. This is filtered off, washed, and if desired dried. The so-obtained green pigment resembles the product of Example 4 in shade, it contains aluminium; it is much greener than the compound of Example 5 of British specification No. 410,814.

*Example 6*

15 parts of metal-free phthalocyanine, 490 parts of thionyl chloride and 120 parts of sulphuryl chloride are heated to boiling in a vessel provided with a reflux condenser. The mixture is boiled for 48 hours. The excess of reagent is then distilled off. The residue is treated as described in Example 4.

The bright green compound contains 36.8% chlorine, or about 8.3 atoms per molecule on the average. This compound is bright green, but somewhat bluer than the product of Example 4.

*Example 7*

15 parts of metal-free phthalocyanine, 490 parts of thionyl chloride and 72 parts of sulphur chloride are mixed and heated until the mixture boils, in a vessel provided with a reflux condenser. Dry chlorine gas is slowly passed into the boiling mixture for 50 hours. Samples taken show that at the end of this time there is no further change in shade and the chlorination appears to be exhaustive in the given conditions. The product is isolated, purified, and dispersed as described in Example 4. This compound is pure green and contains 41.8% chlorine or about 10.2 atoms of chlorine per molecule on the average.

*Example 8*

7 parts of copper octa(3,6)chlorophthalocyanine (made by interaction of 3,6-dichlorophthalic anhydride, cupric chloride, and urea) and 35 parts of bromine are heated in a closed vessel for 15 hours at 270° C. The product is worked up as described in Example 9, below. The green powder obtained dissolves in concentrated sulphuric acid to give a deep red solution. This is poured into water whereupon the new pigment, which is yellowish green, is precipitated, and is washed and dried. This substance is found by analysis to be a mixture of a copper phthalocyanine and a metal-free phthalocyanine.

*Example 9*

7 parts of nickel phthalocyanine (see British specification No. 322,169, Example 3) are heated with 35 parts of bromine in a sealed vessel for 15 hours at 250° C. The excess of bromine and the hydrogen bromide formed are then allowed to escape. The brown residue is heated at 260° C. until no more bromine or hydrogen bromide is evolved. The residue is a bluish green compound which dissolves in sulphuric acid to give a reddish brown solution. This solution when poured into water gives a bright bluish green finely divided precipitate. The precipitate is washed and dried.

This substance contains 2.6% of nickel and 57.6% of bromine, i. e., about 9.7 atoms of bromine per molecule. It gives bluish green shades when used as a pigment in lithographic ink.

*Example 10*

2 parts of zinc phthalocyanine (British specification No. 410,814, Example 4) are treated in the same way as the nickel phthalocyanine of Example 9.

The substance obtained contains 2.2% of zinc and 63.1% of bromine, i. e., about 12.3 atoms of bromine per molecule. It has a yellowish green color.

The new compounds contain preferably from 10 to 12 atoms of halogen per molecule. In the above specific examples metal-free phthalocyanines have been prepared having from about 8 to about 12 chlorine atoms per molecule. The entire group may be generically represented by the formula $C_{32}H_{6+n}N_8Cl_{10-n}H_2$, wherein $n$ has a value not less than $-2$ and not greater than $+2$.

It is found that it is difficult if not impossible to introduce more than 12 atoms of halogen by direct halogenation. There being 16 positions in which substitution can take place it is clear that it is not to be expected that a stable compound which is more than a hexadecahalogeno phthalocyanine can be formed by any process. By direct halogenation of halogen-free phthalocyanines as said, the limit (doubtless for steric and orientation-directive reasons) appears to be reached when about 12 halogen atoms have been introduced. But, by treating a suitably substituted halogenophthalocyanine, e. g., the tetra(3)chloro- or the octa(3,6) chloro, wherein perhaps the already present chlorine atoms may be expected not to impede the entry of others, then the trideca, the tetradeca and higher halogeno phthalocyanines are obtained.

The new compounds differ from their respective parents in solubility in chloronaphthalene.

We claim:

1. A process for the manufacture of bluish-green to green coloring matters of the phthalocyanine series which comprises subjecting a coloring matter of the phthalocyanine series to halogenation.

2. A process for the manufacture of bluish-green to green coloring matters of the phthalocyanine series which comprises subjecting a coloring matter of the phthalocyanine series to halogenation by the aid of a halogenating agent selected from the group consisting of chlorinating agents and brominating agents.

3. A process as in claim 2, the coloring matter selected for halogenation being a metal-free phthalocyanine.

4. A process as in claim 2, the coloring matter selected for halogenation being a polychloro metal-phthalocyanine synthetically prepared from chlorinated initial organic material.

5. A process as in claim 2, wherein the coloring matter being halogenated is suspended in an inert liquid medium during the process of halogenation.

6. A process as in claim 2, the halogenating agent being bromine.

7. A process as in claim 2, the halogenating agent being chlorine.

8. A process as in claim 2, the halogenating agent being sulfuryl chloride.

9. A process as in claim 2, the halogenation being carried out in the presence of aluminum chloride.

REGINALD PATRICK LINSTEAD.
CHARLES ENRIQUE DENT.